US012687833B2

(12) United States Patent
Eizips et al.

(10) Patent No.: US 12,687,833 B2
(45) Date of Patent: Jul. 21, 2026

(54) LOCATION DETERMINATION IN A PHOTOVOLTAIC SYSTEM

(71) Applicant: Tigo Energy, Inc., Campbell, CA (US)

(72) Inventors: Daniel Eizips, Sunnyvale, CA (US); Shmuel Arditi, Discovery Bay, CA (US)

(73) Assignee: Tigo Energy, Inc., Campbell, CA (US)

( * ) Notice: Subject to any disclaimer, the term of this patent is extended or adjusted under 35 U.S.C. 154(b) by 305 days.

(21) Appl. No.: 18/337,632

(22) Filed: Jun. 20, 2023

(65) Prior Publication Data

US 2024/0427300 A1     Dec. 26, 2024

(51) Int. Cl.
| | |
|---|---|
| *G05B 19/042* | (2006.01) |
| *H04B 17/27* | (2015.01) |
| *H04B 17/318* | (2015.01) |

(52) U.S. Cl.
CPC ........... *G05B 19/042* (2013.01); *H04B 17/27* (2015.01); *H04B 17/318* (2015.01); *G05B 2219/37283* (2013.01)

(58) Field of Classification Search
CPC ........ G05B 19/042; G05B 2219/37283; H04B 17/27; H04B 17/318
See application file for complete search history.

(56) References Cited

U.S. PATENT DOCUMENTS

2013/0346054 A1* 12/2013 Mumtaz .................... H02J 3/40
713/300

FOREIGN PATENT DOCUMENTS

WO     WO-2020228959 A1 * 11/2020 ............. H02J 3/381

OTHER PUBLICATIONS

English Translation of "WO-2020228959-A1" (Year: 2020).*
Garg, Aseem, "Ordered Lists in HTML: Syntax, Structure, Types, & More." Retrieved from the Internet: <https://trainings.internshala.com/blog/ordered-lists-in-html>, Aug. 2, 2023.

* cited by examiner

*Primary Examiner* — Charles R Kasenge
(74) *Attorney, Agent, or Firm* — Greenberg Traurig

(57)                    ABSTRACT

A system includes a controller configured to generate a communication signal whose modulation represents coded information to be transmitted to a local management unit connected to a photovoltaic module. The system includes a first local management unit configured to receive a first input communication current from a transmitter and output a first value of the first input communication current to the controller. The system includes a second local management unit configured to receive a second input communication current from the transmitter and output a second value of the second input communication current to the controller. The controller is configured to receive the first value, the second value, order the first value and the second value to generate an ordered list; and store the ordered list in a memory of the controller. The ordered list represents a relative location of the first local management unit and the second local management unit compared to the transmitter.

19 Claims, 3 Drawing Sheets

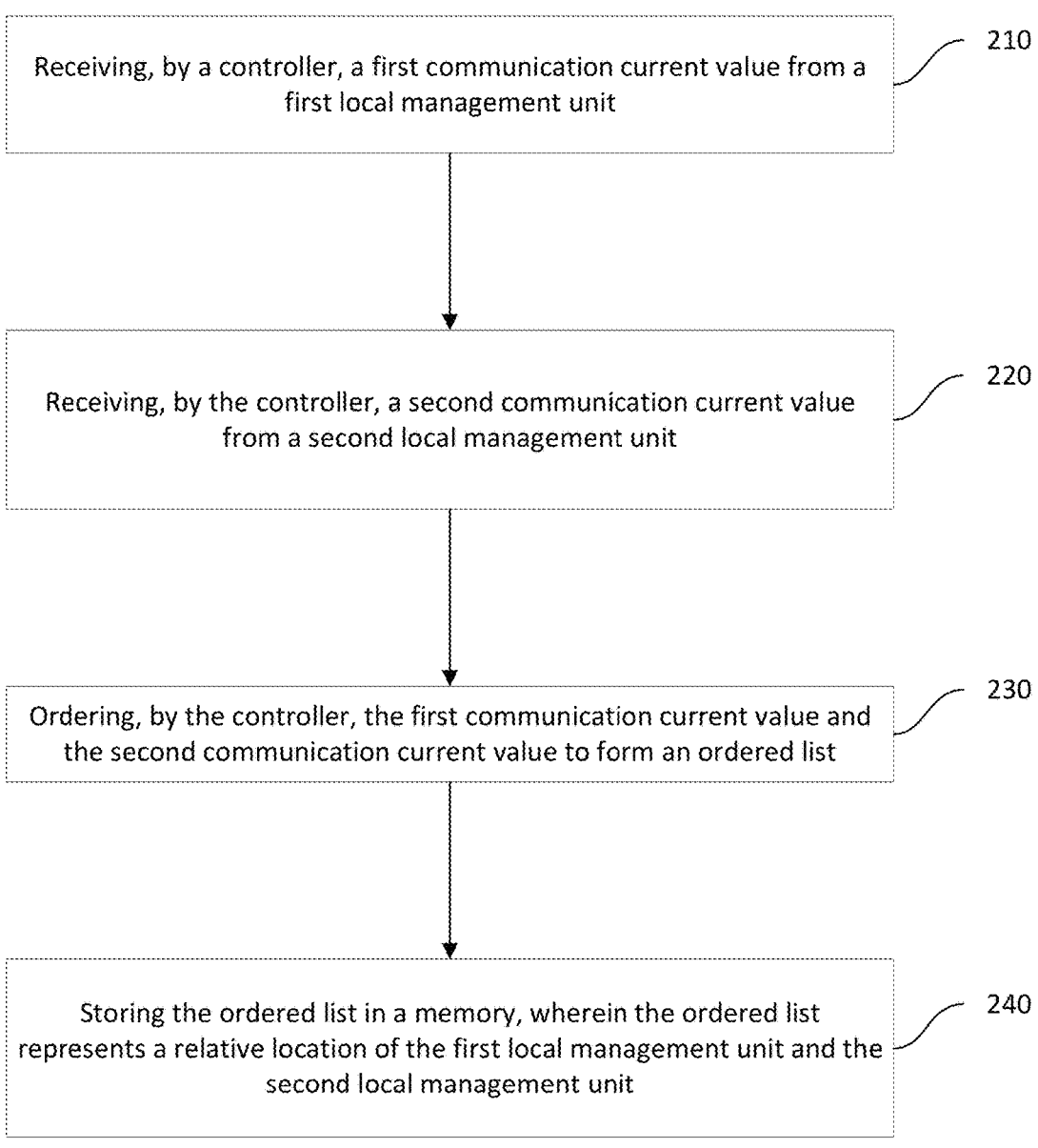

Receiving, by a controller, a first communication current value from a first local management unit — 210

Receiving, by the controller, a second communication current value from a second local management unit — 220

Ordering, by the controller, the first communication current value and the second communication current value to form an ordered list — 230

Storing the ordered list in a memory, wherein the ordered list represents a relative location of the first local management unit and the second local management unit — 240

FIG. 2

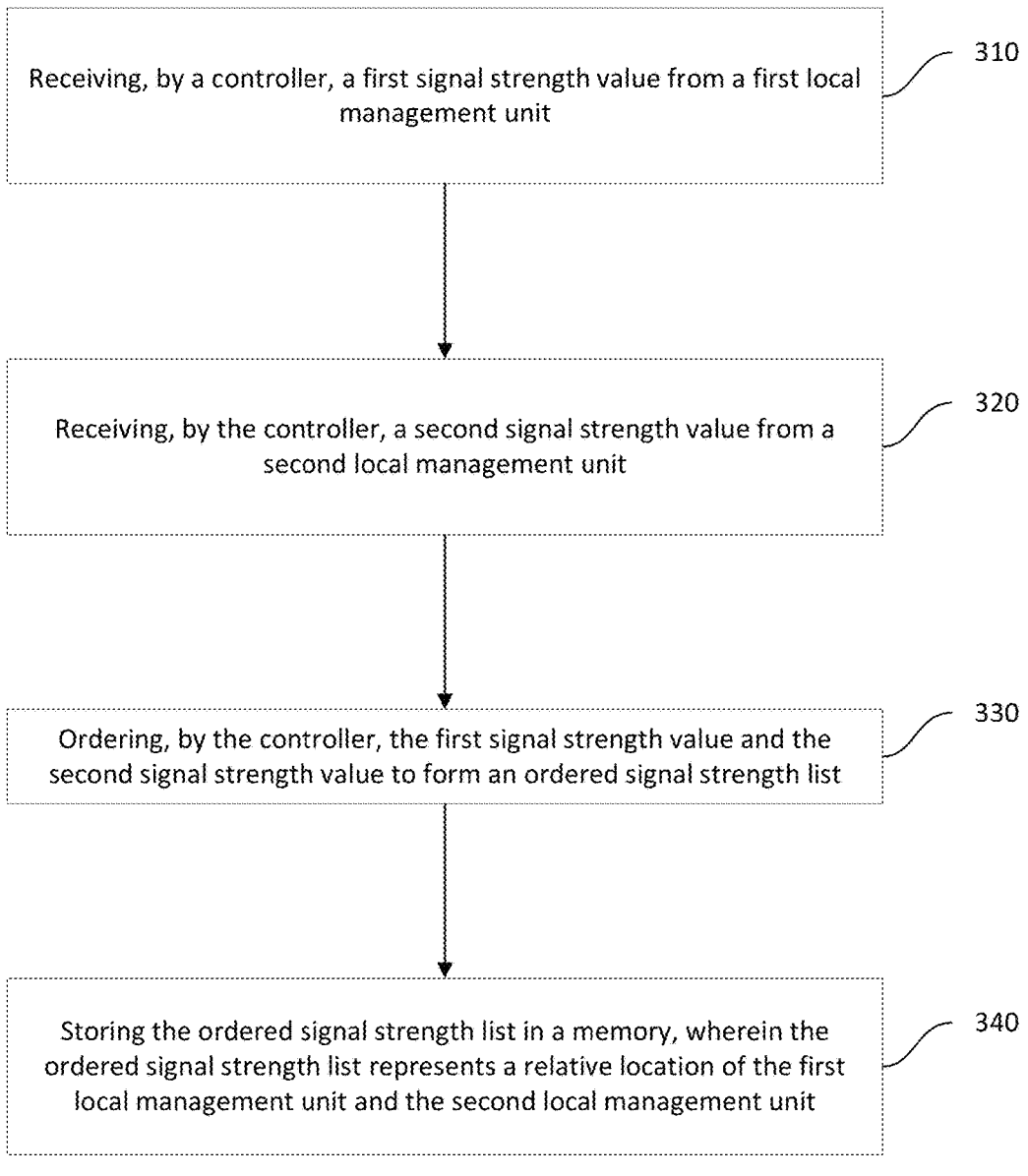

Receiving, by a controller, a first signal strength value from a first local management unit 310

Receiving, by the controller, a second signal strength value from a second local management unit 320

Ordering, by the controller, the first signal strength value and the second signal strength value to form an ordered signal strength list 330

Storing the ordered signal strength list in a memory, wherein the ordered signal strength list represents a relative location of the first local management unit and the second local management unit 340

FIG. 3

LOCATION DETERMINATION IN A PHOTOVOLTAIC SYSTEM

FIELD OF THE TECHNOLOGY

At least some embodiments disclosed herein relate generally to photovoltaic systems. More specifically, the embodiments relate to estimation of a location of one or more panels in a photovoltaic system.

BACKGROUND

Photovoltaic systems can include at least one string of photovoltaic panels. A location of the photovoltaic panels within the photovoltaic system may not always be known. Photovoltaic systems may require maintenance. In some cases, the photovoltaic systems can include a large number of strings. In such cases, it can be difficult to navigate to the appropriate one of the photovoltaic panels requiring maintenance without knowing a location of the photovoltaic panel with the photovoltaic system. Improved ways of determining a location within the photovoltaic system of particular photovoltaic panels may be beneficial.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 shows a flowchart of a method to determine a location of a panel in a photovoltaic system, according to some embodiments.

FIG. 3 shows a flowchart of a method to determine a location of a panel in a photovoltaic system, according to some embodiments.

DETAILED DESCRIPTION

Figure 1:
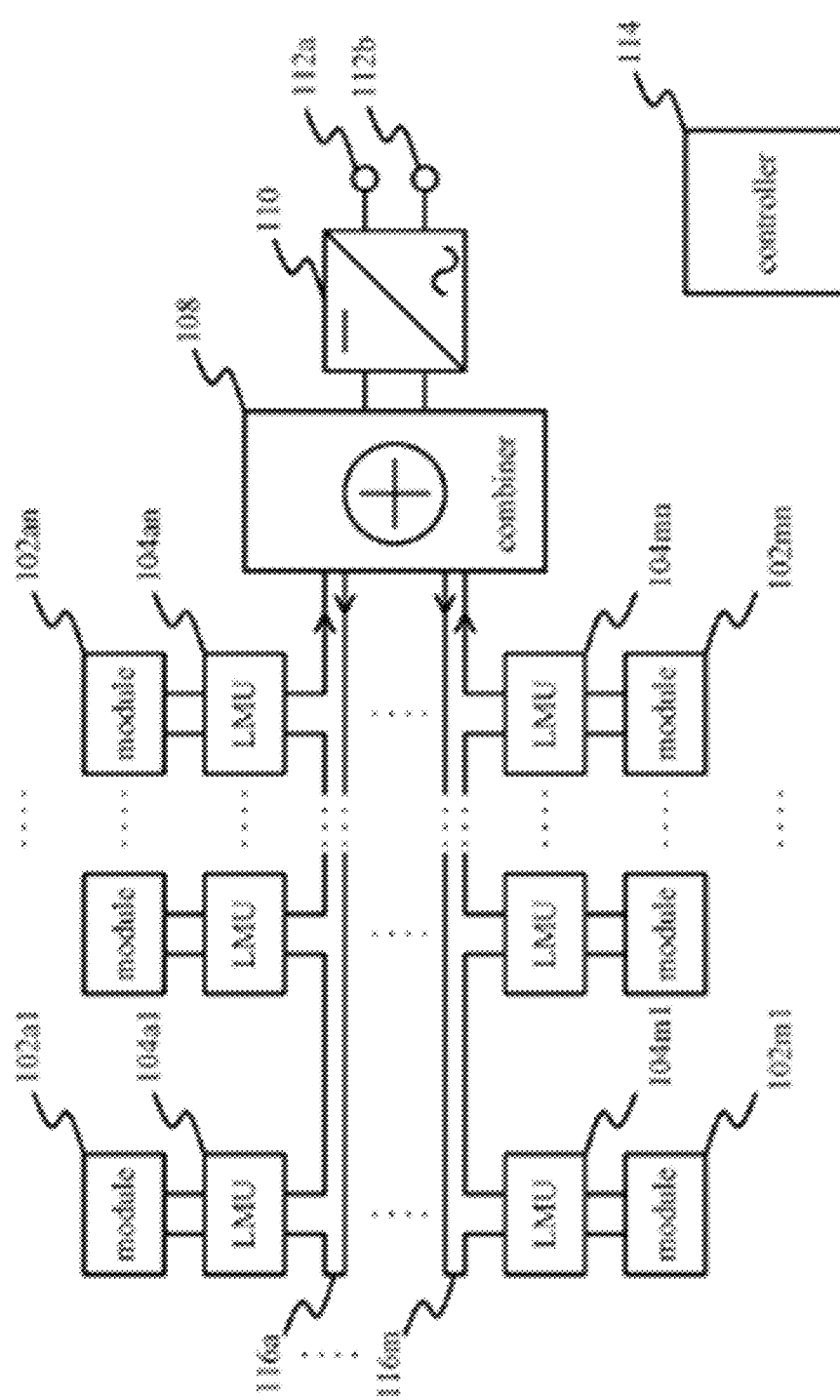
FIG. 1 shows a schematic diagram of a photovoltaic system, according to some embodiments.

The present disclosure relates to a photovoltaic system. Various detailed embodiments of the present disclosure, taken in conjunction with the accompanying figures, are disclosed herein. It is to be understood that the disclosed embodiments are merely illustrative. In addition, each of the examples given in connection with the various embodiments of the present disclosure is intended to be illustrative, and not restrictive.

A large installation of photovoltaic panels can involve multiple sets of power lines connected to multiple strings or groups of photovoltaic panels respectively. In some cases, it is not possible to know an exact location of the different photovoltaic panels in the installation. However, such information can be useful. For example, if there is a problem with one of the photovoltaic panels in the system, it would be beneficial to be able to decipher where that photovoltaic panel is located so that, for example, a technician or the like can navigate directly to the proper location. In some embodiments, especially when the photovoltaic system is located on a roof or is otherwise difficult to traverse between photovoltaic panels, such location determination can also be useful in increasing a safety to the technician, decreasing efforts of the technician, or the like.

Embodiments of this disclosure are directed to systems and methods for determining a location of a photovoltaic panel within a photovoltaic system. In some embodiments, the location can be inferred based on a relative communication signal current at local management units of respective photovoltaic panels. For example, a photovoltaic panel connected closest to a Power Line Communication (PLC) transmitter in the system may have a relatively higher communication signal current, with each photovoltaic panel along the string of the photovoltaic system having a relatively lower communication current. For example, in a photovoltaic system having four panels A, B, C, D, with panel A being closest to the PLC transmitter and panel D being furthest, the current input of panel A is greater than the current input of panel B, which is greater than the current input of panel C, which is greater than the current input of panel D. As a result, the current values can be used to determine the relative location of the panels A, B, C, or D within the photovoltaic system. In some embodiments, the decrease in input communication current can be a result of, for example, losses attributed to a local management unit (LMU) for the individual photovoltaic panel or module level power electronics (MLPE). In some embodiments, the relative locations within the string of photovoltaic panels can be used in conjunction with, for example, a blueprint of the system to determine an exact geographical location of the photovoltaic panel within the photovoltaic system. The current of the signal can be a communication current, which is not a direct current (DC) and is not high power.

In some embodiments, the four panels A, B, C, D (in the above example) can additionally or alternatively include a wireless input/output that communicates with one or more antennas, a wireless receiver, a wireless transmitter device, or combinations thereof, in the system. In such embodiments, a signal strength between the respective panel and the antenna, wireless receiver, or transmitter device could be utilized to determine relative distances from the antenna, wireless receiver, or transmitter device and thus establishing the relative location of the photovoltaic panels in the photovoltaic system. In some embodiments, the relative locations within the string of photovoltaic panels can be used in conjunction with, for example, a blueprint of the system to determine an exact geographical location of the photovoltaic panel within the photovoltaic system.

In some embodiments, both a current input and a wireless signal strength can be used.

FIG. 1 shows a schematic diagram of a photovoltaic system 100, according to some embodiments.

FIG. 1 is a schematic structural diagram illustrating strings of photovoltaic (PV) modules 102 in a PV array, according to some embodiments.

PV modules 102a1 through 102an may each hold one or more PV cells. A group of PV modules 102a1 through 102an connected together can be referred to as a string of PV modules or a string of solar modules. Strings of PV modules 102 can be wired in series via a "string" or power bus 116a through 116m to produce a required output voltage. A PV array, or solar array, may contain multiple strings 116a through 116m of PV modules 102a1 through 102an.

PV modules 102a1 through 102an may be connected to the strings 116a through 116m via local management units (LMUs) 104a1 through 104an, respectively. The LMUs 104a1 through 104an may also be referred to as solar module controllers, solar module converters, or link module units. The LMUs 104*a*1 through 104*an* may include a solar module controller to control the operation of the PV module, to monitor a status of the respective PV module, and to link the respective PV module to the serial power bus for energy delivery and safety. The LMUs 104*a*1 through 104*an* may also perform filtering, disconnect, DC conversion, or combinations thereof, for example, to buck or boost a module output voltage to a desired string voltage, of the power output by their respective solar modules to the strings.

In some embodiments, the LMUs 104*a*1 through 104*an* may use the power bus for sending data and communications. In some embodiments, the LMUs 104*a*1 through 104*an* may be connected to a separate communication network, either via wires or wirelessly. In some embodiments, the LMUs 104*a*1 through 104*an* may use the power bus and one or more of a wired or wireless network for sending data and communications. In some embodiments, an LMU may be configured to operate more than one PV module. For example, an LMU could be configured to operate each solar panel in a solar array, where each solar panel includes two or more solar modules.

The LMUs 104*a*1 through 104*an* may be connected on one side to the solar modules 102*a*1 through 102*an* in parallel, and on the other side in series to strings 116*a* through 116*m*. The LMUs 104*a*1 through 104*an* may receive different types of input communications, for example, a requested duty cycle, which can be expressed as a percentage (e.g., from 0% to 100%) of time the solar module is to be connected to the serial power bus, a phase shift in degrees (e.g., from 0 degrees to 180 degrees), a timing or synchronization pulse, a pairing communication, or combinations thereof. These inputs can be supplied, for example, as discrete signals, or can be supplied as data on a network, or composite signals sent through the power lines 116*a* to 116*m*, or wirelessly, and in yet other cases, as a combination of any of these input types.

In some embodiments, the LMUs 104*a*1 through 104*an* may also monitor a status of the PV modules 102*a*1 through 102*an*, for example, by monitoring sensors which give operating parameters of the module such as voltage, current, temperature, combinations thereof, or the like. In some embodiments, the LMUs 104*a*1 through 104*an* may also monitor local meteorological conditions, for example, such as solar irradiance, air temperature, and the like. The LMUs 104*a*1 through 104*an* may be configured to optimize an operation of their respective PV module using the status of the PV module determined by the monitoring.

In some embodiments, the LMUs 104*a*1 through 104*an* can shut down the solar module based on one or more triggers determined by the monitoring, for example, an overvoltage, a high temperature, or the like, or based on an emergency shutdown signal received from the controller 114. In some embodiments, the controller 114 may output a system OK signal, and the LMUs 104*a*1 through 104*an* shut down their respective solar module if the system OK signal is not received for a predetermined period of time, for example, 10 seconds.

In some embodiments, the LMUs 104*a*1 through 104*an* may communicate the status of the solar modules 102*a*1 through 102*an* and local meteorological conditions to a controller 114. The controller 114 may then determine and generate the input communications for driving the LMUs, for example, a duty cycle, a phase shift, a timing or synchronization pulse, a pairing communication, combinations thereof, or the like, based at least in part on the statuses of the PV modules and the meteorological conditions to optimize a performance of the solar array.

In some embodiments, the controller 114 can cause the LMUs 104*a*1 through 104*an* to shut down their respective PV module based on one or more triggers determined by the monitoring, for example, an overvoltage, a high temperature, or the like, or based on an emergency shutdown signal generated by and sent from the controller 114. The controller 114 generates and sends the emergency shutdown signal, which may be based on an overvoltage in a combiner or an inverter, a condition at connectors 112*a* and 112*b*, for example, to a main power grid or local system, or an external factor, such as a fire alarm, seismic alarm, or the like. In some embodiments, the controller may generate and output a system OK signal, and the LMUs 104*a*1 through 104*an* shut down their respective solar module automatically if the system OK signal is not received for a predetermined period of time, for example, 10 seconds.

In some embodiments, the controller 114 can receive one or more input communication current values from the LMUs 104*a*1 through 104*an*. In some embodiments, the controller 114 can determine, based on the input communication current values from the LMUs 104*a*1 through 104*an* a relative location of the LMUs 104*a*1 through 104*an* to each other and, accordingly, a relative location of the corresponding modules. For example, a PLC current value determined by LMU 104*an* can be relatively larger than a PLC current value determined by LMU 104*a*1. In such embodiments, it can be inferred that the LMU 104*an* is relatively closer to a beginning of the string than LMU 104*a*1. In some embodiments, with this information, a blueprint of the photovoltaic system 100 can be used to determine an exact location of the particular LMU and corresponding solar module within the photovoltaic system 100.

In some embodiments, the LMUs 104*a*1 through 104*an* can be in wireless communication with the controller 114. In some embodiments, the controller 114 can test a signal strength of the respective LMUs. The signal strength can be used to infer an order of the LMUs and their relative location from the controller 114 or an antenna, wireless receiver, or other transmitter device within the photovoltaic system 100. In some embodiments, with this information, a blueprint of the photovoltaic system 100 can be used to determine an exact location of the particular LMU and corresponding solar module within the photovoltaic system 100.

In some embodiments, the controller 114 can use both the input communication current values and the signal strength. In some embodiments, the controller 114 can use the input communication current values without using the signal strength. In some embodiments, the controller 114 can use the signal strength without the input communication current values. In some embodiments, the controller 114 can store the locations in memory of the controller 114. In some embodiments, the controller 114 can output the locations via a network to a remote storage device.

The strings 116*a* through 116*m* are collected in combiner 108. The combiner 108 collects the DC power from the strings 116*a* through 116*m* and supplies DC power to a central inverter 110. The inverter 110 may have filters and capacitors on the input side. A capacitance of the central inverter 110 varies by application; however, in general, there can be a very large capacitance on the input side of an inverter in solar energy applications. Even when the system is shutdown, for example, when a power grid to which the solar array is supplying energy is shutdown, a problem remains that the capacitors on the input side of the central inverter may still be holding a dangerous amount of charge.

The controller 114 may include a microcontroller or small single chip microcontroller (SCMC), for example, or may be implemented using an Application-Specific Integrated Circuit (ASIC), Field-Programmable Gate Array (FPGA), or other programmable logic. The controller 114 can even be implemented in discrete, functionally equivalent circuitry, or in other cases a combination of SCMC and discrete circuitry.

The controller 114 may be a stand-alone unit, or may be integrated with the combiner 108, with the inverter 110, or with both the combiner and the inverter into a single unit. In some embodiments, the controller 114 is integrated with the inverter 110, monitors a performance of the inverter 110, determines and tracks a maximum power point, and controls the LMUs 104*a*1 through 104*an* based on, at least in part, the maximum power point. Further, while depicted as a logical unit for purposes of this disclosure, the controller 114 may be a distributed device.

For example, the controller 114 could include maximum power point tracking (MPPT) circuitry integrated with inverter 110, local control circuitry integrated with LMUs 104*a*1 through 104*an* or with the individual PV modules 102*a*1 through 102*an*, and a stand-alone microcontroller unit (MCU) which communicates with and controls the MPPT and local circuit elements. The MPPT calculations by the MCU may be performed, for example, using one or more known MPPT algorithms such as perturb-and-observe, incremental conductance, current sweep, or constant voltage. The MPPT algorithms find the operating voltage that allows a maximum power output from the inverter. The controller 114 could also include multiple controllers, for example, with each controller being responsible for a string, or for one or more solar modules on a solar panel.

The embodiment of FIG. 1 is a common arrangement of a photovoltaic solar array system, wherein the solar modules 102*a*1 through 102*an* supply DC power to the strings 116*a* through 116*m*. The power is collected by the combiner 108, and then supplied to the inverter 110. While this is one arrangement with which the teachings of the present disclosure may be practiced, it is not the only such arrangement.

FIG. 2 shows a flowchart of a method 200 to determine a location of a panel in a photovoltaic system, according to some embodiments. In some embodiments, the method 200 can be used to determine a location of a solar module 102*a*1 through 102*an* in the photovoltaic system 100 of FIG. 1.

At block 210, the method 200 includes receiving, by a controller, a first PLC current value from a first local management unit. In some embodiments, the first current value is representative of a first input communication current of a PLC transmitter to a first photovoltaic module in a photovoltaic system.

At block 220, the method 200 includes receiving, by the controller, a second current value from a second local management unit. In some embodiments, the second current value representative of a second input communication current to a second photovoltaic module in the photovoltaic system.

At block 230, the method 200 includes ordering, by the controller, the first current value and the second current value to form an ordered list. In some embodiments, the ordered list can be from ordered from largest to smallest. In some embodiments, the ordered list can be ordered from smallest to largest.

At block 240, the method 200 includes storing the ordered list in a memory, wherein the ordered list represents a relative location of the first photovoltaic module and the second photovoltaic module within a string in the photovoltaic system. In some embodiments, the memory can be onboard the controller, the transmitter, the first local management unit, the second local management unit, or combinations thereof. In some embodiments, a largest value in the ordered list is representative of a closest local management unit (and corresponding solar module) to the beginning of the string in the photovoltaic system.

FIG. 3 shows a flowchart of a method 300 to determine a location of a panel in a photovoltaic system, according to some embodiments. In some embodiments, the method 300 can be used to determine a location of a solar module 102*a*1 through 102*an* in the photovoltaic system 100 of FIG. 1.

At block 310, the method 300 includes receiving, by a controller, a first signal strength value from a first local management unit. In some embodiments, the signal strength of the LMU transmitting to a receiver can be determined by the receiver. A receiver can include any device receiving or transmitting communication to or from the LMU or LMUs. In some embodiments, a receiver can be part of a controller and can accordingly be referred to as a controller. In some embodiments, the first signal strength value is representative of a signal strength for the first local management unit to communicate with the controller (or antenna, wireless receiver, or other transmitter device) in a photovoltaic system. In some embodiments, the controller can be part of an inverter in the photovoltaic system. In some embodiments, the controller can be separate from the inverter in the photovoltaic system.

At block 320, the method 300 includes receiving, by the controller, a signal strength value from a second local management unit. In some embodiments, the second signal strength value is representative of a second signal strength for the second local management unit to communicate with the controller.

At block 330, the method 300 includes ordering or calculating, by the controller, the first signal strength value and the second signal strength value to form an ordered signal strength list.

At block 340, the method 300 includes storing the ordered signal strength list in a memory. In some embodiments, the memory can be onboard the controller, the transmitter, the first local management unit, the second local management unit, or combinations thereof. In some embodiments, the ordered signal strength list represents a relative location of the first photovoltaic module and the second photovoltaic module compared to the controller. In some embodiments, the highest signal strength value within the ordered signal strength list is representative of the corresponding local management unit that is relatively closest to the receiver.

In some embodiments, the method 200 and the method 300 can be combined. For example, in some embodiments, the controller can track both the PLC current values and the signal strengths for the local management units within the photovoltaic system. In some embodiments, the controller can be configured to rely on the input communication current values as having a higher priority than the wireless signal strengths. In some embodiments, the controller can be configured to rely on the wireless signal strengths as having a higher priority than the input communication current values. In some embodiments, the controller can rely on the value having the higher priority in situations in which the results are inconsistent.

In some embodiments, a system includes a controller configured to generate a communication signal whose modulation represents coded information to be transmitted to a local management unit connected to a photovoltaic module; and a first local management unit configured to receive a communication signal whose modulation represents coded information from the controller, wherein the first local management unit is configured to: receive a first input communication current from a transmitter; output a first value of the first input communication current to the controller; a second local management unit configured to receive a communication signal whose modulation represents coded information from the controller, wherein the second local management unit is configured to: receive a second input communication current from the transmitter; output a second value of the second input communication current to the controller; wherein the controller is configured to: receive the first value; receive the second value; order the first value and the second value from largest to smallest to generate an ordered list; and store the ordered list in a memory of the controller, wherein the ordered list represents a relative location of the first local management unit and the second local management unit compared to the transmitter.

In some embodiments, a largest value in the ordered list indicates the corresponding one of the first local management unit and the second local management unit in the ordered list is closest to the transmitter.

In some embodiments, the ordered list is output from the controller to a remote storage via a network.

In some embodiments, the first local management unit is configured to wirelessly communicate with the controller.

In some embodiments, the second local management unit is configured to wirelessly communicate with the controller.

In some embodiments, a first signal strength of the first local management unit and a second signal strength of the second local management unit are determined by the controller.

In some embodiments, the controller is configured to order the first signal strength and the second signal strength from highest signal strength to lowest signal strength to generate an ordered signal strength list.

In some embodiments, the controller is configured to store the ordered list in the memory, wherein the ordered signal strength list represents a relative location of the first local management unit and the second local management unit compared to the controller.

In some embodiments, a largest value in the ordered signal strength list indicates the corresponding one of the first local management unit and the second local management unit in the ordered signal strength list is closest to the controller.

In some embodiments, a method includes receiving, by a controller, a first current value from a first local management unit, the first current value representative of a first input communication current to a first photovoltaic module in a photovoltaic system; receiving, by the controller, a second current value from a second local management unit, the second current value representative of a second input communication current to a second photovoltaic module in the photovoltaic system; ordering, by the controller, the first current value and the second current value to form an ordered list; and storing the ordered list in a memory of the controller, wherein the ordered list represents a relative location of the first photovoltaic module and the second photovoltaic module compared to a transmitter in the photovoltaic system.

In some embodiments, a largest value in the ordered list indicates the corresponding one of the first local management unit and the second local management unit in the ordered list is closest to the transmitter.

In some embodiments, the method includes outputting the ordered list from the controller to a remote storage via a network.

In some embodiments, the first local management unit and the second local management unit are configured to wirelessly communicate with the controller.

In some embodiments, the method includes determining, by the controller, a first signal strength of the first local management unit and a second signal strength of the second local management unit; and ordering the first signal strength and the second signal strength to generate an ordered signal strength list.

In some embodiments, the method includes storing the ordered signal strength list in the memory, wherein the ordered signal strength list represents a relative location of the first local management unit and the second local management unit compared to the controller.

In some embodiments, a method includes receiving, by a controller, a first signal strength value from a first local management unit, the first signal strength value representative of a signal strength for the first local management unit to communicate with the controller in a photovoltaic system; receiving, by the controller, a signal strength value from a second local management unit, the second signal strength value representative of a second signal strength for the second local management unit to communicate with the controller; ordering, by the controller, the first signal strength value and the second signal strength value to form an ordered signal strength list; and storing the ordered signal strength list in a memory of the controller, wherein the ordered signal strength list represents a relative location of the first photovoltaic module and the second photovoltaic module compared to the controller.

In some embodiments, a largest value in the ordered signal strength list indicates the corresponding one of the first local management unit and the second local management unit in the ordered signal strength list is closest to the controller.

In some embodiments, the method includes receiving, by a controller, a first current value from a first local management unit, the first current value representative of a first input communication current to a first photovoltaic module in a photovoltaic system; receiving, by the controller, a second current value from a second local management unit, the second current value representative of a second input communication current to a second photovoltaic module in the photovoltaic system; ordering, by the controller, the first current value and the second current value to form an ordered list; and storing the ordered list in a memory of the controller, wherein the ordered list represents a relative location of the first photovoltaic module and the second photovoltaic module compared to a transmitter in the photovoltaic system.

In some embodiments, a largest value in the ordered list indicates the corresponding one of the first local management unit and the second local management unit in the ordered list is closest to the transmitter.

In some embodiments, the method includes outputting the ordered list and the ordered signal strength list from the controller to a remote storage via a network.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

In some embodiments, a system, including: a plurality of photovoltaic modules; an inverter; a controller configured to generate a signal to be transmitted to a local management unit connected to at least one of the plurality of photovoltaic modules; and a first local management unit configured to receive a communication signal from the controller, wherein the first local management unit is configured to: calculate a first input communication current; output a first value of the first input communication current to the controller; a second local management unit configured to receive a communication signal, wherein the second local management unit is configured to: calculate a second input communication current; output a second value of the second input communication current to the controller; wherein the controller is configured to: calculate the first value; calculate the second value; order the first value and the second value to generate an ordered list; and store the ordered list in a memory of the controller, wherein the ordered list represents a relative location of the first local management unit and the second local management unit.

In some embodiments, a system, wherein a largest value in the ordered list indicates a corresponding one of the first local management unit and the second local management unit in the ordered list is closest to a transmitter.

In some embodiments, a system, wherein the communication signal is a signal whose modulation represents coded information.

In some embodiments, a system, further including outputting the ordered list from the controller to a remote storage via a network.

In some embodiments, a system, wherein the first local management unit is configured to wirelessly communicate with the controller, wherein the second local management unit is configured to wirelessly communicate with the controller.

In some embodiments, a system, wherein a first signal strength of the first local management unit and a second signal strength of the second local management unit are determined by the controller.

In some embodiments, a system, wherein the controller is configured to order the first signal strength and the second signal strength from highest signal strength to lowest signal strength to generate an ordered signal strength list.

In some embodiments, a system, wherein the controller is configured to store the ordered list in the memory, wherein the ordered signal strength list represents a relative location of the first local management unit and the second local management unit compared to the controller.

In some embodiments, a system, wherein the system includes a plurality of controllers, wherein the plurality of controllers is used to determine a location of the first local management unit or the second local management unit.

In some embodiments, a method, including: receiving, by a controller, a first communication current value from a first local management unit; receiving, by the controller, a second communication current value from a second local management unit; ordering, by the controller, the first current value and the second current value to form an ordered list; and storing the ordered list in a memory, wherein the ordered list represents a relative location of the first local management unit and the second local management unit compared to a transmitter in a photovoltaic system.

In some embodiments, a method, wherein a largest value in the ordered list indicates a corresponding one of the first local management unit and the second local management unit in the ordered list is closest to the transmitter.

In some embodiments, a method, wherein the first local management unit is configured to receive a first communication signal whose modulation represents coded information.

In some embodiments, a method, wherein the first local management unit and the second local management unit are configured to wirelessly communicate with the controller.

In some embodiments, a method, further including determining or receiving, by the controller, a first signal strength of the first local management unit and a second signal strength of the second local management unit; and ordering the first signal strength and the second signal strength to generate an ordered signal strength list.

In some embodiments, a method, wherein a plurality of controllers or a plurality of receives are used to determine a location of the first local management unit or the second local management unit.

In some embodiments, a method, including: determining, by a controller, a first signal strength value from a first local management unit, the first signal strength value representative of a signal strength for the first local management unit; determining, by the controller, a signal strength value from a second local management unit, the second signal strength value representative of a second signal strength for the second local management unit; ordering, by the controller, the first signal strength value and the second signal strength value to form an ordered signal strength list; and storing the ordered signal strength list in a memory, wherein the ordered signal strength list represents a relative location of the first local management unit and the second local management unit compared to the controller.

In some embodiments, a method, wherein a plurality of controllers or a plurality of receivers are used to determine a location of the first local management unit or the second local management unit.

In some embodiments, a method, further including: receiving a first communication current value from a first local management unit, the first current value representative of a first input communication current to the first local management unit in a photovoltaic system; receiving a second communication current value from a second local management unit, the second current value representative of a second input communication current to the second local management unit in the photovoltaic system; ordering, by the controller, the first current value and the second current value to form an ordered list; and storing the ordered list in a memory, wherein the ordered list represents a relative location of the first local management unit and the second local management unit compared to a transmitter in the photovoltaic system.

In some embodiments, a method, wherein a largest value in the ordered list indicates a corresponding one of the first local management unit and the second local management unit in the ordered list is closest to the transmitter.

In some embodiments, a method, further including outputting the ordered list and the ordered signal strength list to a remote storage via a network.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

11

What is claimed is:

1. A system, comprising:

a plurality of photovoltaic modules;

an inverter;

a controller configured to generate a signal to be transmitted to a local management unit connected to at least one of the plurality of photovoltaic modules; and a first local management unit configured to receive a communication signal from the controller, wherein the first local management unit is configured to:

calculate a first input communication current;

output a first value of the first input communication current to the controller;

a second local management unit configured to receive a communication signal, wherein the second local management unit is configured to:

calculate a second input communication current;

output a second value of the second input communication current to the controller;

wherein the controller is configured to:

calculate the first value;

calculate the second value;

order the first value and the second value to generate an ordered list; and store the ordered list in a memory of the controller, wherein the ordered list represents a relative location of the first local management unit and the second local management unit.

2. The system of claim 1, wherein a largest value in the ordered list indicates a corresponding one of the first local management unit and the second local management unit in the ordered list is closest to a transmitter.

3. The system of claim 1, wherein the communication signal is the signal whose modulation represents coded information.

4. The system of claim 1, further comprising outputting the ordered list from the controller to a remote storage via a network.

5. The system of claim 1, wherein the first local management unit is configured to wirelessly communicate with the controller, wherein the second local management unit is configured to wirelessly communicate with the controller.

6. The system of claim 5, wherein a first signal strength of the first local management unit and a second signal strength of the second local management unit are determined by the controller.

7. The system of claim 6, wherein the controller is configured to order the first signal strength and the second signal strength from highest signal strength to lowest signal strength to generate an ordered signal strength list.

8. The system of claim 7, wherein the controller is configured to store the ordered list in the memory, wherein the ordered signal strength list represents a relative location of the first local management unit and the second local management unit compared to the controller.

9. The system of claim 8, wherein the system comprises a plurality of controllers, wherein the plurality of controllers is used to determine a location of the first local management unit or the second local management unit.

10. A method, comprising:

receiving, by a controller, a first communication current value from a first local management unit;

wherein the first communication current value is calculated from a communication signal received at the first local management unit from the controller;

receiving, by the controller, a second communication current value from a second local management unit;

wherein the second communication current value is calculated from a communication signal received at the second local management unit from the controller;

ordering, by the controller, the first communication current value and the second communication current value to form an ordered list; and storing the ordered list in a memory, wherein the ordered list represents a relative location of the first local management unit and the second local management unit compared to a transmitter in a photovoltaic system.

11. The method of claim 10, wherein a largest value in the ordered list indicates a corresponding one of the first local management unit and the second local management unit in the ordered list is closest to the transmitter.

12. The method of claim 10, wherein the first local management unit is configured to receive a first communication signal whose modulation represents coded information.

13. The method of claim 10, wherein the first local management unit and the second local management unit are configured to wirelessly communicate with the controller.

14. The method of claim 13, further comprising determining or receiving, by the controller, a first signal strength of the first local management unit and a second signal strength of the second local management unit; and ordering the first signal strength and the second signal strength to generate an ordered signal strength list.

15. The method of claim 10, wherein a plurality of controllers or a plurality of receivers are used to determine a location of the first local management unit or the second local management unit.

16. A method, comprising:

determining, by a controller, a first signal strength value from a first local management unit, the first signal strength value representative of a signal strength for the first local management unit;

determining, by the controller, a signal strength value from a second local management unit, the second signal strength value representative of a second signal strength for the second local management unit;

ordering, by the controller, the first signal strength value and the second signal strength value to form an ordered signal strength list;

storing the ordered signal strength list in a memory, wherein the ordered signal strength list represents a relative location of the first local management unit and the second local management unit compared to the controller;

receiving a first communication current value from the first local management unit, the first current value representative of a first input communication current to the first local management unit in a photovoltaic system;

receiving a second communication current value from the second local management unit, the second current value representative of a second input communication current to the second local management unit in the photovoltaic system;

ordering, by the controller, the first current value and the second current value to form an ordered list; and storing the ordered list in the memory, wherein the ordered list represents a relative location of the first local management unit and the second local management unit compared to a transmitter in the photovoltaic system.

17. The method of claim 16, wherein a plurality of controllers or a plurality of receivers are used to determine a location of the first local management unit or the second local management unit.

18. The method of claim 16, wherein a largest value in the ordered list indicates a corresponding one of the first local management unit and the second local management unit in the ordered list is closest to the transmitter.

19. The method of claim 18, further comprising outputting the ordered list and the ordered signal strength list to a remote storage via a network.

\* \* \* \* \*